(12) United States Patent  
Pasqualini

(10) Patent No.: US 7,424,507 B1  
(45) Date of Patent: Sep. 9, 2008

(54) HIGH SPEED, LOW POWER, PIPELINED ZERO CROSSING DETECTOR THAT UTILIZES CARRY SAVE ADDERS

(75) Inventor: Ronald Pasqualini, Los Altos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 752 days.

(21) Appl. No.: 10/955,697

(22) Filed: Sep. 30, 2004

(51) Int. Cl.  
*G06F 7/50* (2006.01)

(52) U.S. Cl. ...................................... 708/670

(58) Field of Classification Search ................. 708/670  
See application file for complete search history.

(56) References Cited

U.S. PATENT DOCUMENTS

| | | | | | |
|---|---|---|---|---|---|
| 3,535,502 | A | * | 10/1970 | Clapper | 708/709 |
| 4,486,850 | A | * | 12/1984 | Hyatt | 708/494 |
| 4,507,745 | A | * | 3/1985 | Agrawal | 708/134 |
| 4,791,601 | A | * | 12/1988 | Tanaka | 708/630 |
| 6,029,187 | A | * | 2/2000 | Verbauwhede | 708/625 |
| 2004/0177105 | A1 | * | 9/2004 | Satoh et al. | 708/620 |

* cited by examiner

*Primary Examiner*—Tan V. Mai  
(74) *Attorney, Agent, or Firm*—Mark C. Pickering

(57) ABSTRACT

A zero crossing detector employs carry save adders combined with fully pipelined logic to provide two-bit, three-bit or four-bit zero crossing detection. The detector offers the advantages of very high operating speed, very low power dissipation, low adder cell count and reduced chip area.

22 Claims, 10 Drawing Sheets

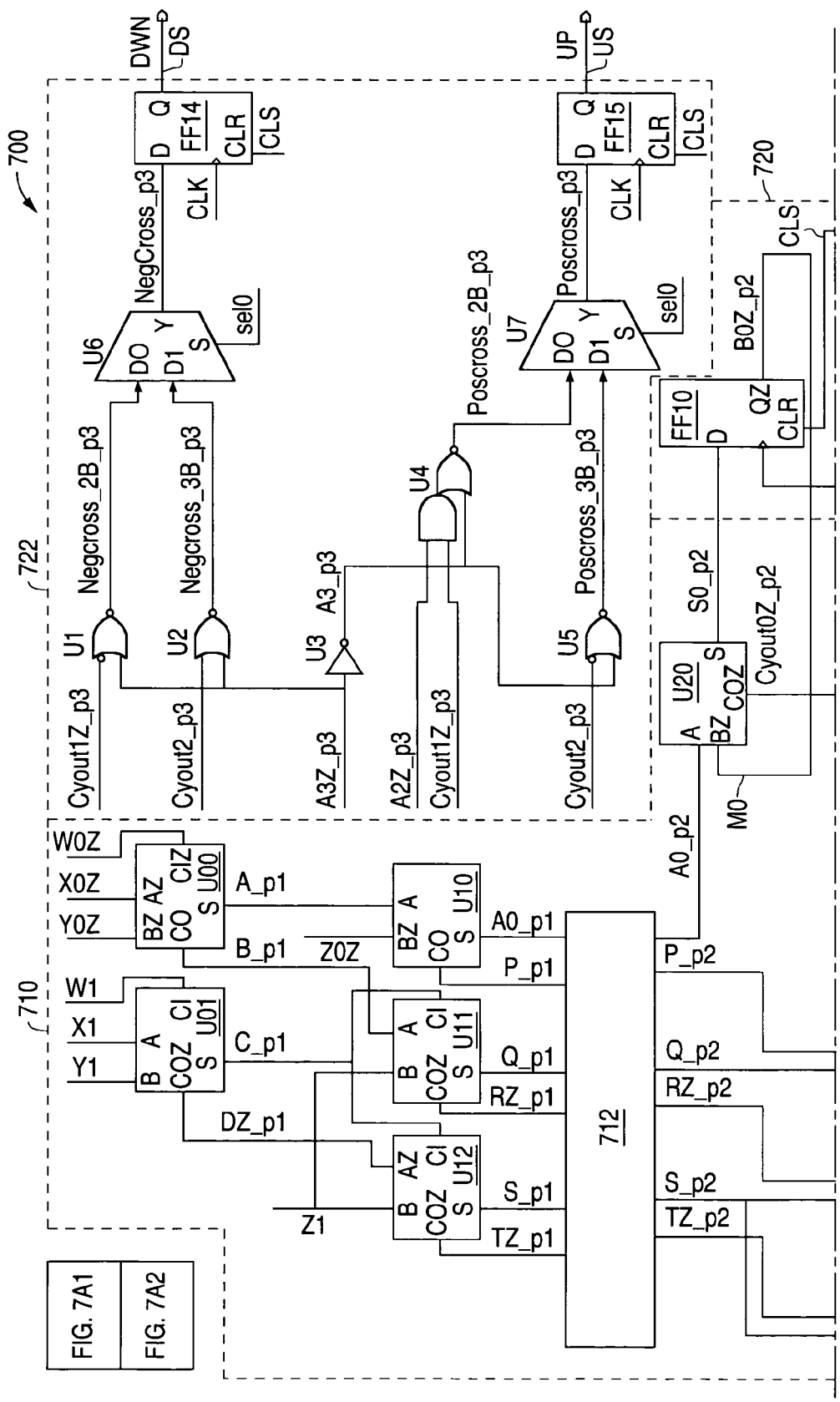
FIG. 7A1

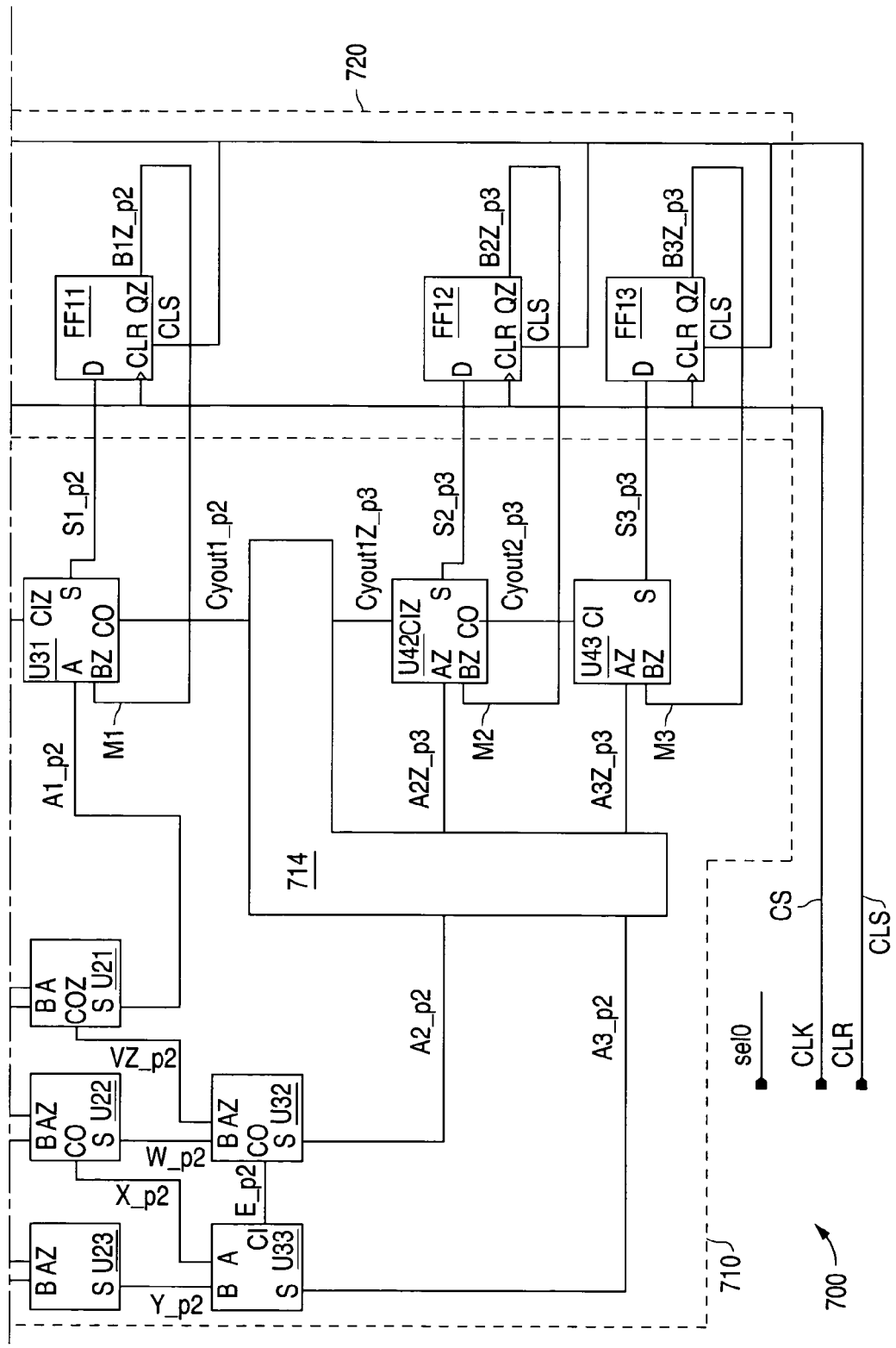
FIG. 7A2

HIGH SPEED, LOW POWER, PIPELINED ZERO CROSSING DETECTOR THAT UTILIZES CARRY SAVE ADDERS

BACKGROUND OF THE INVENTION

1. Field of the Invention

The present invention relates to a zero crossing detector and, more particularly, to a high speed, low-power, pipelined zero crossing detector that utilizes carry save adders.

2. Description of the Related Art

Zero crossing detectors are useful in a wide variety of applications, including set point controllers and clock recovery circuits. A zero crossing detector typically utilizes an adder array, which has sum and carry outputs, to add together a number of signed binary numbers. The resulting sum and carry outputs of the adder array can then be examined to determine whether or not a zero crossing has occurred.

In many zero crossing applications, the signed binary numbers input to the adder array are only a few bits in length. For example, each signed binary number input to the adder array can be limited to two bits which, in turn, can be used to represent the numbers 0, +1, and −1, e.g., 00=0, 01=1, 11=−1, and 10=(not allowed).

Clock recovery applications provide a good example of the use of signed binary numbers with a limited number of bits. In a clock recovery application, a user must determine whether or not the rising edge of the clock is centered in the middle of the input data transition, or whether the rising clock edge is early or late. These three possibilities can be represented by the three numbers 0, −1, and +1 which, in turn, require two bits.

FIG. 1 shows a block diagram that illustrates a prior-art, zero crossing detector 100. As shown in FIG. 1, zero crossing detector 100, which is suitable for use in clock recovery applications, has four two-bit binary number inputs. The four two-bit binary number inputs include inputs W0 and W1, X0 and X1, Y0 and Y1, and Z0 and Z1.

Each two-bit input pair W0/W1, X0/X1, Y0/Y1, and Z0/Z1 receives an input signal pair WT0/WT1, XT0/XT1, YT0/YT1 and ZT0/ZT1, respectively. The input signal pairs WT0/WT1, XT0/XT1, YT0/YT1 and ZT0/ZT1, in turn, each have logic states that represent one of three signed numbers, 0, +1, and −1, e.g., 00=0, 01=1, 11=−1, and 10=(not allowed). The inputs W0, X0, Y0 and Z0 represent the least significant bits, while the inputs W1, X1, Y1 and Z1 represent the most significant bits.

In addition, zero crossing detector 100 also has a clock input CLK that receives a clock signal CS used to accumulate the input values, and a clear input CLR that receives a clear signal CLS used to reset detector 100. Zero crossing detector 100 also has an up output UP that generates an up signal US, and a down output DWN that generates a down signal DS.

In operation, zero crossing detector 100 only asserts the up signal US on the up output UP when a positive zero crossing is detected, and the down signal DS on the down output DWN when a negative zero crossing is detected. If no zero crossing is detected, both the up and down signals US and DS remain inactive.

The maximum and minimum binary values that can be placed on each input pair W0/W1, X0/X1, Y0/Y1, and Z0/Z1 are the same, +1 and −1, respectively. Thus, when the binary values on the input pairs W0/W1, X0/X1, Y0/Y1 and Z0/Z1 are each equal to the maximum value, the maximum positive sum is +4.

Similarly, when the binary values on the input pairs W0/W1, X0/X1, Y0/Y1 and Z0/Z1 are each equal to the minimum value, the minimum negative sum is −4. In addition, the binary values on the input pairs W0/W1, X0/X1, Y0/Y1 and Z0/Z1 can also sum to zero and positive and negative values in between.

As a result, zero crossing detector 100 can receive the following nine signed values:
−4, −3, −2, −1, 0, +1, +2, +3, and +4.

In order to accommodate the nine signed values shown above, zero crossing detector 100 must have at least four bits. However, the zero crossing logic can be designed to detect two-bit zero crossings, three-bit zero crossings and four-bit zero crossings.

FIGS. 2A-2C show three circular state diagrams that illustrate the operation of three prior-art, zero crossing detectors. FIG. 2A shows the operation of a two-bit zero crossing detector 200A, FIG. 2B shows the operation of a three-bit zero crossing detector 200B, and FIG. 2C shows the operation of a four-bit zero crossing detector 200C.

As shown in FIGS. 2A-2C, the circular state diagrams resemble automobile tachometers and, as a result, can be referred to as "RPM counters". The two-bit RPM counter shown in FIG. 2A has only four states: 0, +1, −2 and −1, each of which can be "pointed to" by the arrow emanating from the center of the circle. In addition, the zero crossing line (ZCL) is located between the value −1 and the value 0.

In operation, when one of the positive input values +1, +2, +3 or +4 is input to zero crossing detector 100, the arrow will rotate in the positive direction (clockwise) a number of steps as defined by the positive input value. Similarly, when one of the negative input values −1, −2, −3 or −4 is input to zero crossing detector 100, the arrow will rotate in the negative direction (counterclockwise) a number of steps as defined by the negative input value.

For example, when the arrow in FIG. 2A is pointing to +1 and zero crossing detector 100 receives a value of +3, zero crossing detector 100 rotates the arrow forward by three steps, causing it to land on the value zero. In so doing, the arrow sweeps past the ZCL in the positive (clockwise) direction, thereby generating a positive zero crossing.

Similarly, when the arrow in FIG. 2A is pointing to +1 and zero crossing detector 100 receives a value of −3, zero crossing detector 100 rotates the arrow backward by three steps, causing it to land on the value −2. In so doing, the arrow sweeps past the ZCL in the negative (counterclockwise) direction, thereby generating a negative zero crossing.

Furthermore, when the arrow in FIG. 2A is pointing to +1 and zero crossing detector 100 receives a value of −1, zero crossing detector 100 rotates the arrow backward by one step, causing it to land on the value zero. In so doing, the arrow does not sweep past the ZCL in the negative (counterclockwise) direction, and thus no zero crossing occurs.

Similarly, when the arrow in FIG. 2A is pointing to +1 and zero crossing detector 100 receives a value of +1, zero crossing detector 100 rotates the arrow forward by one step, causing it to land on the value −2. In so doing, the arrow does not sweep past the ZCL in the positive (clockwise) direction, and thus no zero crossing occurs.

The three-bit and four-bit zero crossing detectors 200B and 200C shown in FIGS. 2B and 2C operate in exactly the same manner as two-bit zero crossing detector 200A operates, except that detectors 200B and 200C have more states. As a result of having more states, detectors 200B and 200C generate zero crossings less frequently.

For example, if zero crossing detector 200A receives the maximum or minimum input value of +4 or −4, respectively, a positive or negative zero crossing always occurs no matter where the arrow is initially pointing. However, if zero crossing detector 200C is initially pointing to a value between +4 and −5, and detector 200C receives the maximum or minimum input value of +4 or −4, respectively, no zero crossing occurs.

FIG. 3 shows a block diagram that further illustrates prior-art, zero crossing detector 100. As shown in FIG. 3, detector 100 includes an adder array 310, an accumulator register 312, and a zero crossing logic block 314. As further shown in FIG. 3, the input pairs W0/W1, X0/X1, Y0/Y1 and Z0/Z1 are inputs to adder array 310 and, as noted above, each receives a signed two-bit number that represents the numbers 0, +1, and −1 (the value −2 is prohibited).

Furthermore, adder array 310 also has four sum inputs SUM0-SUM3 that receive four sum signals M0, M1, M2 and M3, respectively. The four sum signals M0-M3 are generated by accumulator register 312 and represent the current binary value held in accumulator register 312. In addition, adder array 310 also generates four sum outputs S0, S1, S2 and S3 that produce four sum signals SM0, SM1, SM2 and SM3, respectively, and four carry outputs CY0, CY1, CY2 and CY3 that generate four carry output signals C0, C1, C2 and C3, respectively.

Referring to FIG. 3, adder array 310 adds up five numbers: The four signed two-bit input numbers WT0/WT1, XT0/XT1, YT0/YT1, ZT0/ZT1, and the signed 4 bit number M0-M3 from accumulator register 312. Adder array 310 then drives the binary value of the sum signals SM0-SM3 on the sum outputs S0-S3 to accumulator register 312.

Furthermore, adder array 310 also drives the binary values of the sum and carry signals SM0-SM3 and C0-C3 on the sum and carry outputs S0-S3 and CY0-CY3 to the zero crossing logic block 314. Zero crossing logic block 314 then uses these signals to generate the zero crossing signals up and down, US and DS. As described above, the up signal US is asserted when a positive zero crossing is detected, while the down signal DS is asserted when a negative zero crossing is detected. If no zero crossing is detected, the up and down signals US and DS remain inactive.

FIG. 4 shows a block diagram that illustrates prior-art, adder array 310. As shown in FIG. 4, adder array 310 has a number of adder cells U, including half adder cells HA and full adder cells FA, that are arranged in rows and columns. Each half adder cell HA has first and second inputs A and B, a sum output S, and a carry output CO. Furthermore, each full adder cell FA is similar to half adder cell HA, except that each full adder cell FA also includes a carry input CI.

In the FIG. 4 example, adder array 310 has 16 adder cells U00-U03, U10-U13, U20-U23 and U30-U33 that are arranged in four rows, ROW0, ROW1, ROW2 and ROW3 respectively. Each row of cells, in turn, has one half adder cell HA (representing the least significant bit) and three full adder cells FA.

In operation, the adder cells U00-U03 in first row ROW0 add together the binary value on the inputs W0/W1 with the binary value on the inputs X0/X1. The sum of the binary values on the inputs W0/X0 and W1/X1 is then added to the binary value on the inputs Y0/Y1 by the adder cells U10-U13 in the second row ROW1.

Similarly, the sum of the W, X, and Y inputs is next added to the binary value on the inputs Z0/Z1 by the adder cells U20-U23 in the third row ROW2. Finally, the sum of the W, X, Y, and Z inputs is then added to the binary value on the sum inputs SUM0-SUM3, as represented by the sum signals M0-M3, by the adder cells U30-U33 in the fourth row ROW3. Adder array 310 generates the sum of its 5 input numbers on the four sum outputs S0, S1, S2 and S3, and on its four carry outputs CY0, CY1, CY2 and CY3.

Although adder array 310 can be used for low to medium speed applications, one drawback of adder array 310 is that it is too slow to be used in high speed applications. The primary reason for this is that all of the carry outputs of the adder cells U in one row must become valid before all of the inputs in the next row can become valid.

For example, as shown in FIG. 4, the input B of full adder U11 can not become valid until the output S of full adder U01 becomes valid, which can not become valid until the carry input CI of adder cell U01 becomes valid. Similarly, the input B of full adder U12 can not become valid until the output S of full adder U02 becomes valid, which can not become valid until the carry input CI of adder cell U02 becomes valid.

Thus, to be used in high speed applications, the horizontal carry propagation delay must be reduced. (The horizontal propagation delay in the last row ROW3 can not be eliminated because the zero crossing logic requires the values that are generated by the sum outputs S0-S3 and the carry outputs CY0-CY3 by the last row ROW3 of adder cells U30-U33.)

FIG. 5 shows a block diagram that illustrates a prior-art adder array 500. Adder array 500 is similar to adder array 310 and, as a result, utilizes the same reference numerals to designate the structures that are common to both arrays. As shown in FIG. 5, adder array 500 differs from adder array 310 in that adder cells U03 and U13 have been eliminated, and adder cell U23 has been reduced from a full adder to a half adder.

The above simplifications can be made because, when the binary values on the inputs W0/W1 and X0/X1 are summed together in first row ROW0, the resulting sum can only range from −2 to +2. Since this range only contains five values, it can be represented by only three bits with three adder cells U. In addition, the adder cells U10-U12 in second row ROW1 add the binary value on the inputs Y0/Y1 to the sum of the W and X inputs. Thus, the sum output from second row ROW1 can only range from −3 to +3. Since this range only contains 7 values, it can also be represented by only three bits with three adder cells U.

Furthermore, the adder cells U20-U23 in third row ROW2 add the binary value on the inputs Z0/Z1 to the sum of the W, X, and Y inputs. Thus, the sum output from third row ROW2 can range from −4 to +4. Since this range contains 9 values, it must be represented by four adder bits with four adder cells U. However, as shown in FIG. 5, the most significant adder cell U23 in third row ROW2 can be changed from a full adder to a half adder because it only needs to sum two inputs.

Although simplified adder array 500 is faster than adder array 312, adder array 500 remains too slow for many high speed applications. As a result, there is a need for a faster adder array.

BRIEF DESCRIPTION OF THE DRAWINGS

FIG. 2A illustrates the operation of a two-bit, zero crossing detector 200A, FIG. 2B illustrates the operation of a three-bit, zero crossing detector 200B, and FIG. 2C illustrates the operation of a four-bit, zero crossing detector 200C.

FIGS. 7A1-7C are views illustrating an example of a zero crossing detector 700 in accordance with the present invention.

DETAILED DESCRIPTION OF THE INVENTION

Figure 6:
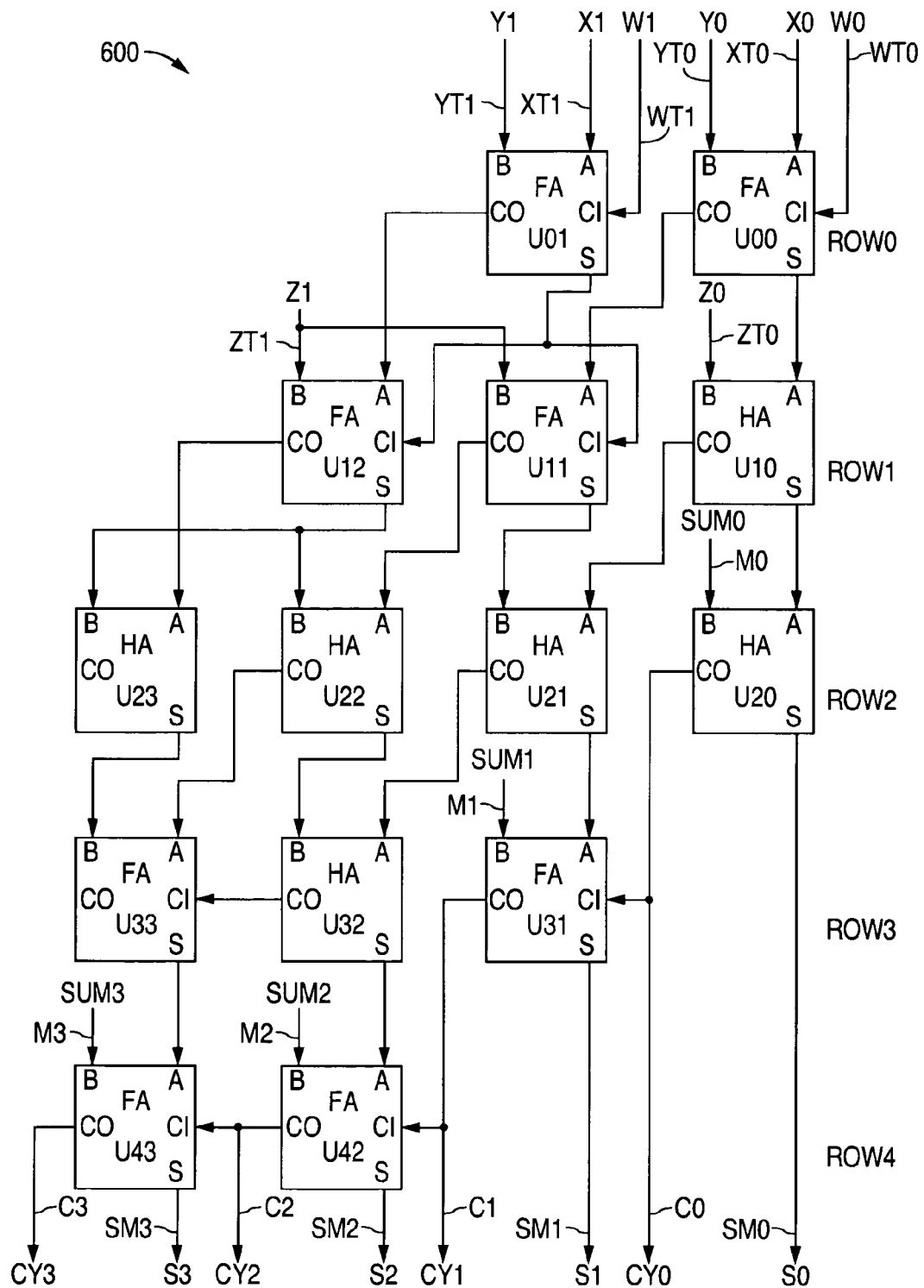
FIG. 6 is a block diagram illustrating an example of an adder array 600 in accordance with the present invention.

FIG. 6 shows a block diagram that illustrates an example of an adder array 600 in accordance with the present invention. As described in greater detail below, adder array 600 substantially reduces the horizontal carry propagation delay by utilizing carry save adders, which can be combined with fully pipelined logic.

As shown in FIG. 6, adder array 600 has four two-bit binary number inputs that include inputs W0 and W1, X0 and X1, Y0 and Y1 and Z0 and Z1. Each two-bit input pair W0/W1, X0/X1, Y0/Y1 and Z0/Z1 receives an input signal pair WT0/VT1, XT0/XT1, YT0/YT1 and ZT0/ZT1, respectively.

The input signal pairs WT0/WT1, XT0/XT1, YT0/YT1 and ZT0/ZT1, in turn, each have logic states that represent one of three signed numbers, 0, +1 and −1, e.g., 00=0, 01=+1, 11=−1, and 10=(not allowed). The inputs W0, X0, Y0 and Z0 represent the least significant bits, while the inputs W1, X1, Y1 and Z1 represent the most significant bits.

Furthermore, adder array 600 also has four sum inputs SUM0-SUM3 that receive four sum signals M0, M1, M2 and M3, respectively. The four sum signals M0-M3 which, for example, can be generated by an accumulator register, represent the current binary value held by the accumulator register.

In addition, adder array 600 also has four sum outputs S0, S1, S2 and S3, that generate four sum signals SM0, SM1, SM2 and SM3, respectively, and four carry outputs CY0, CY1, CY2 and CY3 that generate four carry out signals C0, C1, C2 and C3, respectively. The sum and carry outputs S0-S3 and CY0-CY3 generate signals that represent the result of the addition performed by adder array 600.

As further shown in FIG. 6, adder array 600 has a number of adder cells U, including half adder cells HA and full adder cells FA, that are arranged into rows and columns. The half adder cells HA and full adder cells FA each have first and second inputs A and B, a sum output S and a carry output CO. Furthermore, each full adder cell FA also has a carry input CI.

In the FIG. 6 example, adder array 600 has 14 adder cells U00-U01, U10-U12, U20-U23, U31-U33 and U42-U43 that are arranged in five rows: ROW0, ROW1, ROW2, ROW3 and ROW4, respectively. Specifically, in the first row ROW0, the first and second inputs A and B of first adder cell U00, which is a full adder FA, are connected to the inputs X0 and Y0, respectively, while the carry input CI of first adder cell U00 is connected to the input W0. The sum output S of first adder cell U00 is connected to the first input A of adder cell U10, and the carry output CO of first adder cell U00 is connected to the first input A of adder cell U11.

Furthermore, the first and second inputs A and B of second adder cell U01, which is a full adder FA, are connected to the inputs X1 and Y1, respectively, while the carry input CI of second adder cell U01 is connected to the input W1. The sum output S of second adder cell U01 is connected to the carry input CI of adder cells U11 and U12, and the carry output CO of second adder cell U01 is connected to the first input A of adder cell U12.

As shown in FIG. 6, in the second row ROW1, the first and second inputs A and B of third adder cell U10, which is a half adder HA, are connected to the sum output S of adder cell U00 and the input Z0, respectively. The sum output S of third adder cell U10 is connected to the first input A of adder cell U20, and the carry output CO of third adder cell U10 is connected to the first input A of adder cell U21.

Furthermore, the first and second inputs A and B of fourth adder cell U11, which is a full adder FA, are connected to the carry output CO of adder cell U00 and the input Z1, respectively, while the carry input CI of fourth adder cell U11 is connected to the sum output S of adder cell U01. The sum output S of fourth adder cell U11 is connected to the second input B of adder cell U21, and the carry output CO of fourth adder cell U11 is connected to the first input A of adder cell U22.

The first and second inputs A and B of fifth adder cell U12, which is a full adder FA, are connected to the carry output CO of adder cell U01 and the input Z1, respectively, while the carry input CI of fifth adder cell U12 is connected to the sum output S of adder cell U01. The sum output S of fifth adder cell U12 is connected to the second inputs B of adder cells U22 and U23, and the carry output CO of fifth adder cell U12 is connected to the first input A of adder cell U23.

In the third row ROW2, the first and second inputs A and B of sixth adder cell U20, which is a half adder HA, are connected to the sum output S of adder cell U10 and the input SUM0, respectively. The sum output S of sixth adder cell U20 is connected to the first sum output S0 of adder array 600, and the carry output CO of sixth adder cell U20 is connected to the carry input CI of adder cell U31, and to the first carry output CY0 of adder array 600.

Furthermore, the first and second inputs A and B of seventh adder cell U21, which is a half adder HA, are connected to the carry output CO of adder cell U10 and the sum output S of adder cell U11, respectively. The sum output S of seventh adder cell U21 is connected to the first input A of adder cell U31, and the carry output CO of seventh adder U21 is connected to the first input A of adder cell U32.

The first and second inputs A and B of eighth adder cell U22, which is a half adder HA, are connected to the carry output CO of adder cell U11 and the output S of adder cell U12, respectively. The sum output S of eighth adder cell U22 is connected to the second input B of adder cell U32, and the carry output CO of eighth adder U22 is connected to the first input A of adder cell U33.

The first and second inputs A and B of ninth adder cell U23, which is a half adder HA, are connected to the carry output CO of adder cell U12 and the output S of adder cell U12, respectively. The sum output S of ninth adder cell U23 is connected to the second input B of adder cell U33, and the carry output CO of ninth adder cell U23 is left unconnected.

In the fourth row ROW3, the first and second inputs A and B of tenth adder cell U31, which is a full adder FA, are connected to the sum output S of adder cell U21 and the input SUM1, respectively, while the carry input CI of tenth adder cell U31 is connected to the carry output CO of adder cell U20. The sum output S of tenth adder cell U31 is connected to the second sum output S1 of adder array 600, and the carry output CO of tenth adder cell U31 is connected to the carry input CI of adder U42 and to the second carry output CY1 of adder array 600.

Furthermore, the first and second inputs A and B of eleventh adder cell U32, which is a half adder HA, are connected to the carry output CO of adder cell U21 and the sum output S of adder cell U22, respectively. The sum output S of eleventh adder cell U32 is connected to the first input A of adder cell U42, and the carry output CO of eleventh adder cell U32 is connected to the carry input CI of adder cell U33.

The first and second inputs A and B of twelfth adder cell U33, which is a full adder FA, are connected to the carry output CO of adder cell U22 and the sum output S of adder cell U23, respectively, while the carry input CI of twelfth adder cell U33 is connected to the carry output CO of adder cell U32. The sum output S of twelfth adder cell U33 is connected to the first input A of adder cell U43, and the carry output CO of twelfth adder cell U33 is left unconnected.

In the fifth row ROW4, the first and second inputs A and B of thirteenth adder cell U42, which is a full adder FA, are connected to the sum output S of adder cell U32 and the input SUM2, respectively, while the carry input CI of thirteenth adder cell U42 is connected to the carry output CO of adder cell U31. The sum output S of thirteenth adder cell U42 is connected to the third sum output S2 of adder array 600, and the carry output CO of thirteenth adder cell U42 is connected to the carry input of adder cell U43 and to the second carry output CY2 of adder array 600.

The first and second inputs A and B of fourteenth adder cell U43, which is a full adder FA, are connected to the sum output S of adder cell U33 and the input SUM3, respectively, while the carry input CI of fourteenth adder cell U43 is connected to the carry output CO of adder cell U42. The sum output S of fourteenth adder cell U43 is connected to the fourth sum output S3 of adder array 600, and the carry output CO of fourteenth adder cell U43 is connected to the third carry output CY3 of adder array 600.

In operation, first adder cell U00 in the first row ROW0 adds together the binary values on the inputs W0, X0, and Y0. The sum of the binary values on the inputs W0, X0, and Y0 is then added to the binary value on the input Z0 by adder cell U10 in the second row ROW1. Following this, the sum of the W0, X0, Y0, and Z0 inputs is next added to the binary value on the input SUM0 by adder cell U20 in the third row ROW2. Finally, the sum of the W0, X0, Y0, Z0, and SUM0 inputs is generated at the first sum output S0 and the first carry output CY0 of adder array 600.

In addition, second adder cell U01 in the first row ROW0 adds together the binary values on the inputs W1, X1, and Y1. The sum of the binary values on the inputs W1, X1, and Y1 is then added to both the binary value on the carry output CO of adder cell U00 and the input Z1 by adder cell U11.

Following this, the sum of adder cell U11 is next added to the binary value on the carry output CO of adder cell U10 by adder cell U21 in the third row ROW2. Finally, the sum of adder cell U21, the binary value on input SUM1, and the binary value of the carry output CO of adder cell U20 are summed together by adder cell U31. The sum output S of adder cell U31 provides the second sum output S1 of adder array 600, and the carry output CO of adder cell U31 provides the second carry output CY1 of adder array 600.

Furthermore, fifth adder cell U12 in the second row ROW1 adds together the binary values on the carry output CO of adder cell U01, the sum output S of adder cell U01, and the input Z1. The sum of adder cell U12 and the binary value on the carry output CO of adder cell U11 are added together by adder cell U22.

The sum from adder cell U22 and the binary value on the carry output CO of adder cell U21 are added together by adder cell U32. The sum from adder cell U32, the binary value on the input SUM2, and the binary value on the carry output of adder cell U31 are then added together by adder cell U42. The sum output S of adder cell U42 provides the third sum output S2 of adder array 600, and the carry output CO of adder cell U42 provides the third carry output CY2 of adder array 600.

In addition, ninth adder cell U23 in the third row ROW2 adds together the binary values on the carry output CO of adder cell U12 and the sum output S of adder cell U12. The sum of adder cell U23, the binary value on the carry output CO of adder cell U22, and the binary value on the carry output CO of adder cell U32 are added together by adder cell U33.

The sum from adder cell U33, the binary value on the input SUM3, and the binary value on the carry output CO of adder cell U42 are added together by adder cell U43. The sum output S of adder cell U43 provides the fourth sum output S3 of adder array 600, and the carry output CO of adder cell U43 provides the fourth carry output CY3 of adder array 600.

One of the advantages of adder array 600 is that it utilizes a carry save technique that nearly eliminates the horizontal carry propagation delay of arrays 310 and 500. Ignoring the horizontal carry propagation delay between the four bottom-most cells U20, U31, U42 and U43, only cell U32 has a horizontal carry. As a result, adder array 600 is substantially faster than adder arrays 310 and 500. However, for very high speed applications, carry save adder array 600 may still be too slow.

Figure 1:
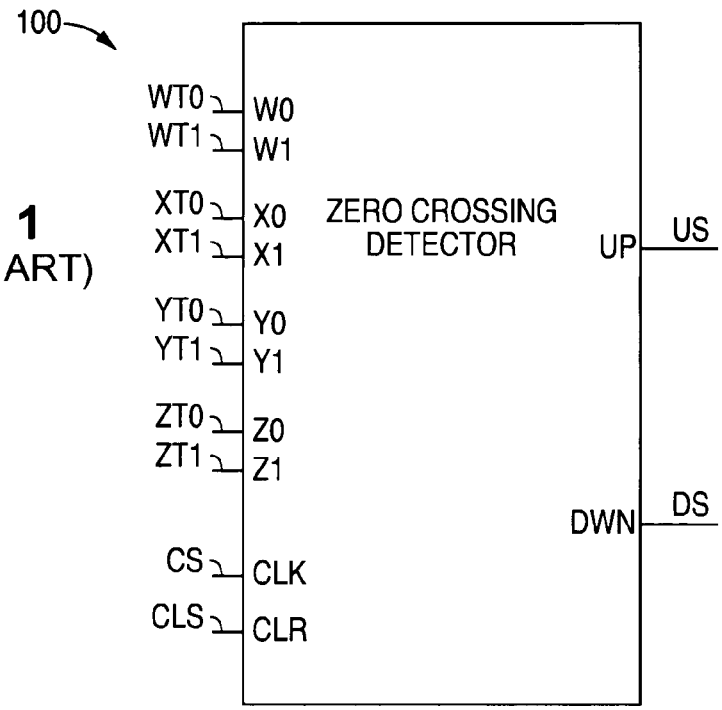
FIG. 1 is a block diagram illustrating a prior-art, zero crossing detector 100.
Figure 2A:
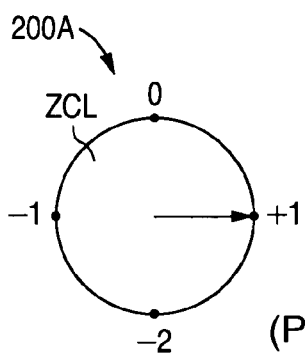
FIGS. 2A-2C are three circular state diagrams illustrating the operation of three prior-art, zero crossing detectors.
Figure 2B:
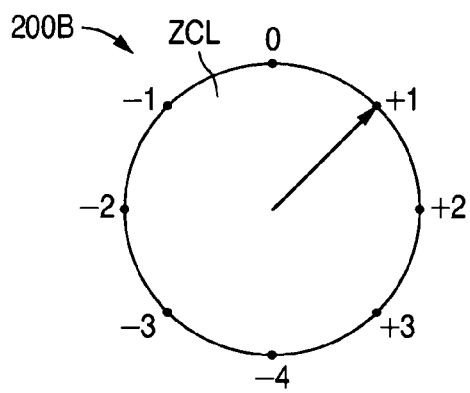
Figure 2C:
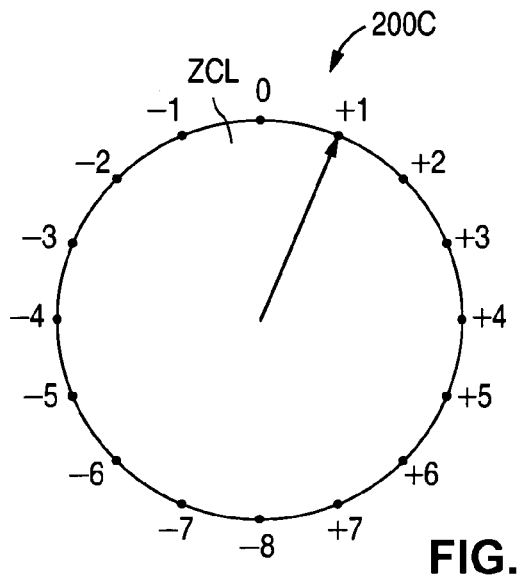
Figure 3:
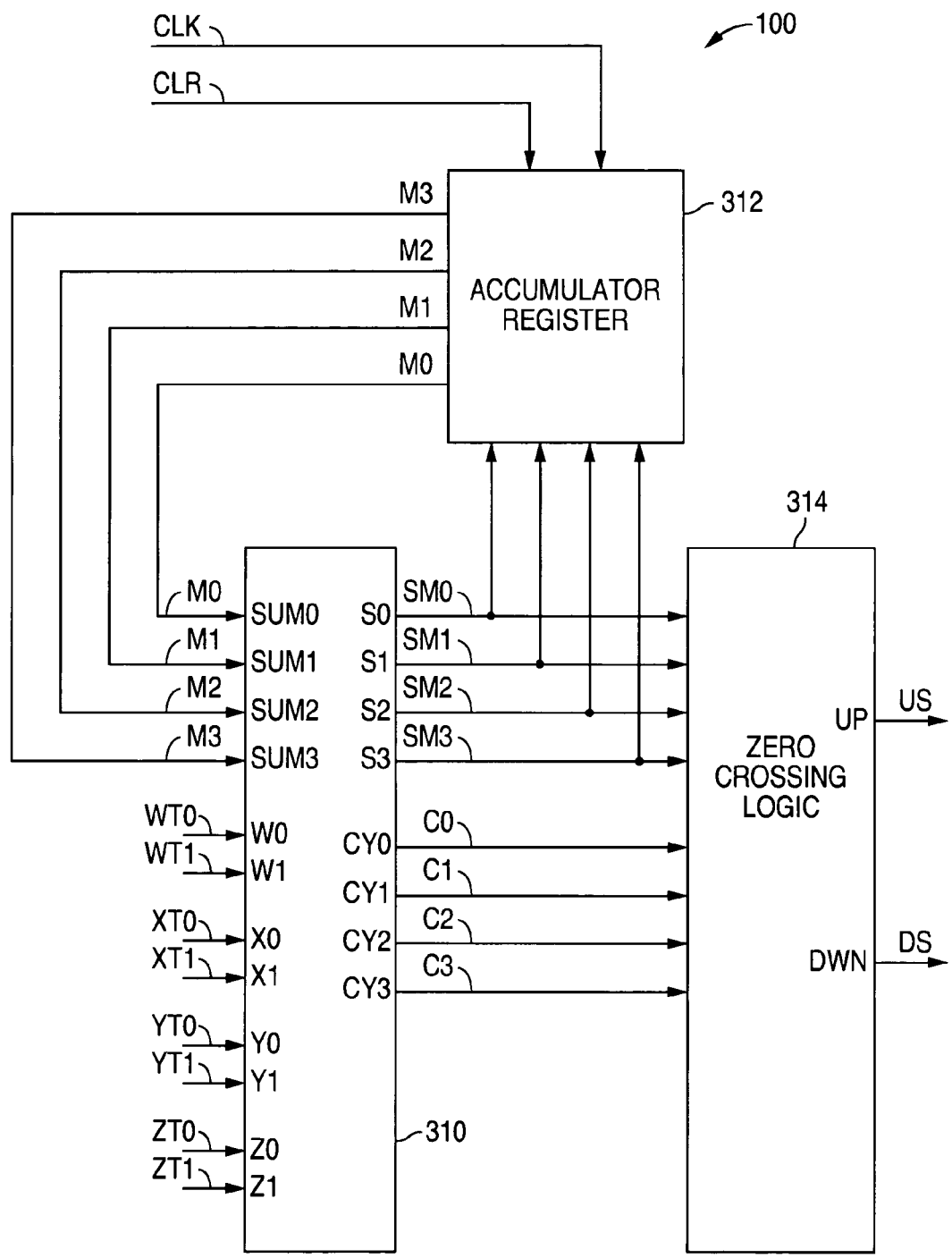
FIG. 3 is a block diagram further illustrating prior-art, zero crossing detector 100.
Figure 4:
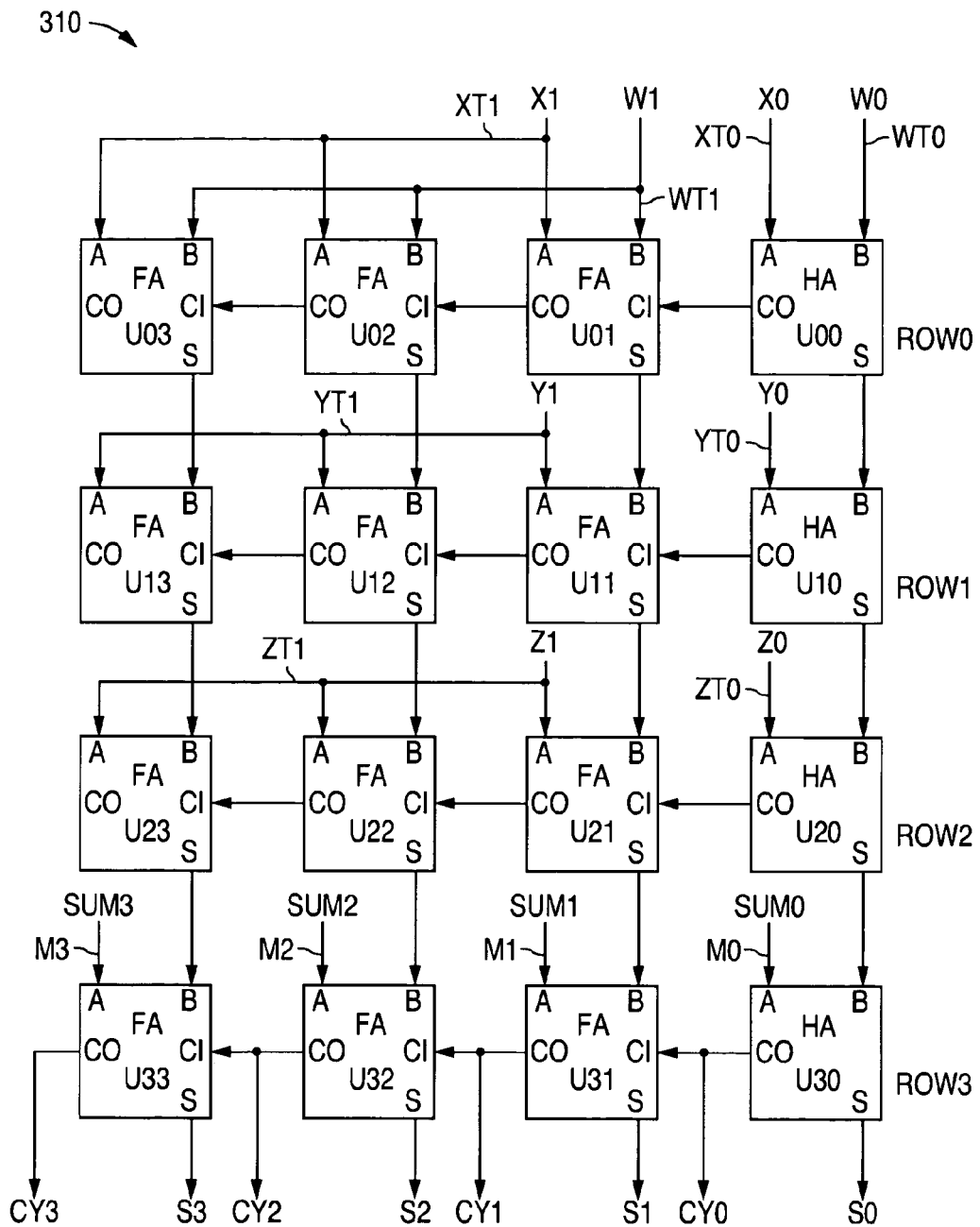
FIG. 4 is a block diagram illustrating prior-art, adder array 310.
Figure 5:
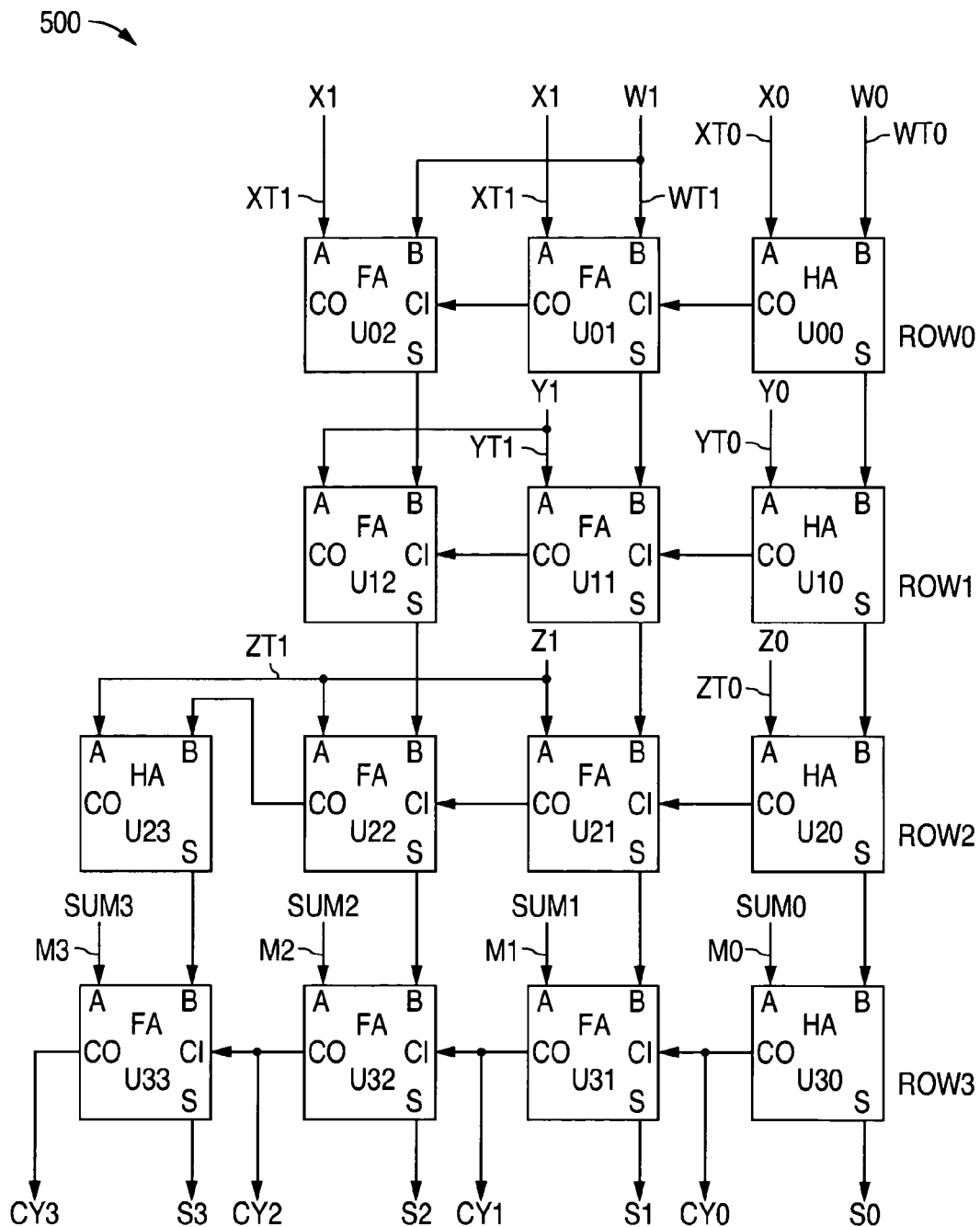
FIG. 5 is a block diagram illustrating a prior-art, adder array 500.

FIGS. 7A1-7C show views that illustrate an example of a zero crossing detector 700 in accordance with the present invention. As shown in FIGS. 7A1-7A2, detector 700 includes a clock input CLK that receives a clock signal CS, and a clear input CLR that receives a clear signal CLS used to reset detector 700. Zero crossing detector 700 also has an up output UP that generates an up signal US, and a down output DWN that generates a down signal DS.

Furthermore, zero crossing detector 700 also includes an adder array 710. Adder array 710 is similar to adder array 600 and, as a result, utilizes the same reference numerals to designate the structures which are common to both adders. As further shown in FIGS. 7A1-7A2, adder array 710 differs from adder array 600 in that adder array 710 includes a first pipelined stage 712.

Pipelined stage 712 stores six sum and carry out signals from adder array 710. These signals include A0_p1, P_p1, Q_p1, RZ_p1, S_p1 and TZ_p1, which are output by adder cells U10, U11 and U12 of second row ROW1, in response to the clock signal CS received on the clock input CLK. In addition, first pipelined stage 712 also outputs six sum and carry out signals A0_p2, P_p2, Q_p2, RZ_p2, S_p2 and TZ_p2, to adder cells U20, U21, U22, and U23 in third row ROW2.

Figure 7B:
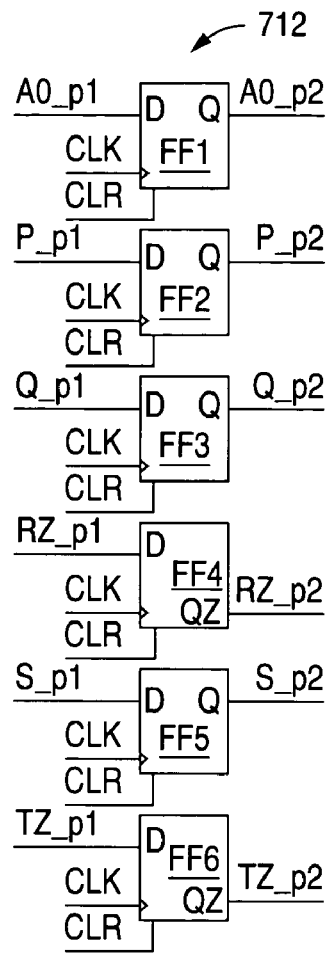

FIG. 7B shows an example of first pipelined stage 712 in accordance with the present invention. As shown in FIG. 7B, first pipelined stage 712 can be implemented with six flip-flops FF1-FF6.

Furthermore, adder array 710 also includes a second pipelined stage 714 that stores three sum and carry out signals A2_p2, A3_p2, and Cyout1_p2. These three signals are output by adder cells U31, U32, and U33 of fourth row ROW3, in response to the clock signal CS received on the clock input CLK.

In addition, second pipelined stage 714 also outputs three sum and carry out signals A2Z_p3, A3Z_p3, and Cyout1Z_p3, respectively, to adder cells U42 and U43 in fifth row ROW4. Thus pipelined stage 712 is non-inverting, whereas pipelined stage 714 is inverting.

Figure 7C:
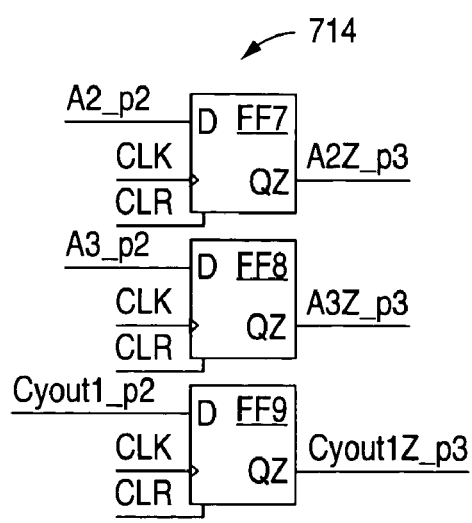

FIG. 7C shows an example of second pipelined stage 714 in accordance with the present invention. As shown in FIG. 7C, second pipelined stage 714 can be implemented with three flip-flops FF7-FF9. Adder array 710 also uses some inverting inputs. For example, adder cell U00 receives the inverted input signals W0Z, X0Z and Y0Z, whereas the input signals W1, X1 and Y1 are non-inverted.

One of the advantages of using pipelined stages 712 and 714 is that these stages maximize the speed of adder array 710. Thus, in comparison to an un-pipelined adder array such as adder array 600, each section of a pipelined adder array has fewer adder cells U. As a result of this, the signal propagation paths within each pipelined section are reduced, thereby speeding up the maximum operating frequency of the entire adder array. (One downside to pipelining is that the clocked flip-flops increase the latency between the adder array inputs and the adder array outputs. However, in most zero crossing applications, this additional latency is not a problem.)

As shown in FIGS. 7A1-7A2, zero crossing detector 700 includes an accumulator 720 that contains four D flip-flops FF10-FF13. These flip-flops accumulate the binary value received from adder cells U20, U31, U42 and U43.

Zero crossing detector 700 further includes a zero crossing logic block 722 that includes logic devices U1-U7 and flip-flops FF14 and FF15. When a positive zero crossing is detected, flip-flop FF15 asserts an up signal US on an up output UP. Similarly, when a negative zero crossing is detected, flip-flop FF14 asserts a down signal DS on a down output DWN. Both signals US and DS remain unasserted when no zero crossing is detected.

Again referring to FIGS. 7A1-7A2, logic devices U6 and U7 are multiplexers which are controlled by a select signal sel0. Multiplexers U6 and U7, which are controlled by select signal sel0, determine whether two-bit zero crossings or three-bit zero crossings are output from zero crossing logic block 722. (For example, multiplexers U6 and U7 pass D0 when sel0 equals zero, and D1 when sel0 equals one.)

Figure 8A:
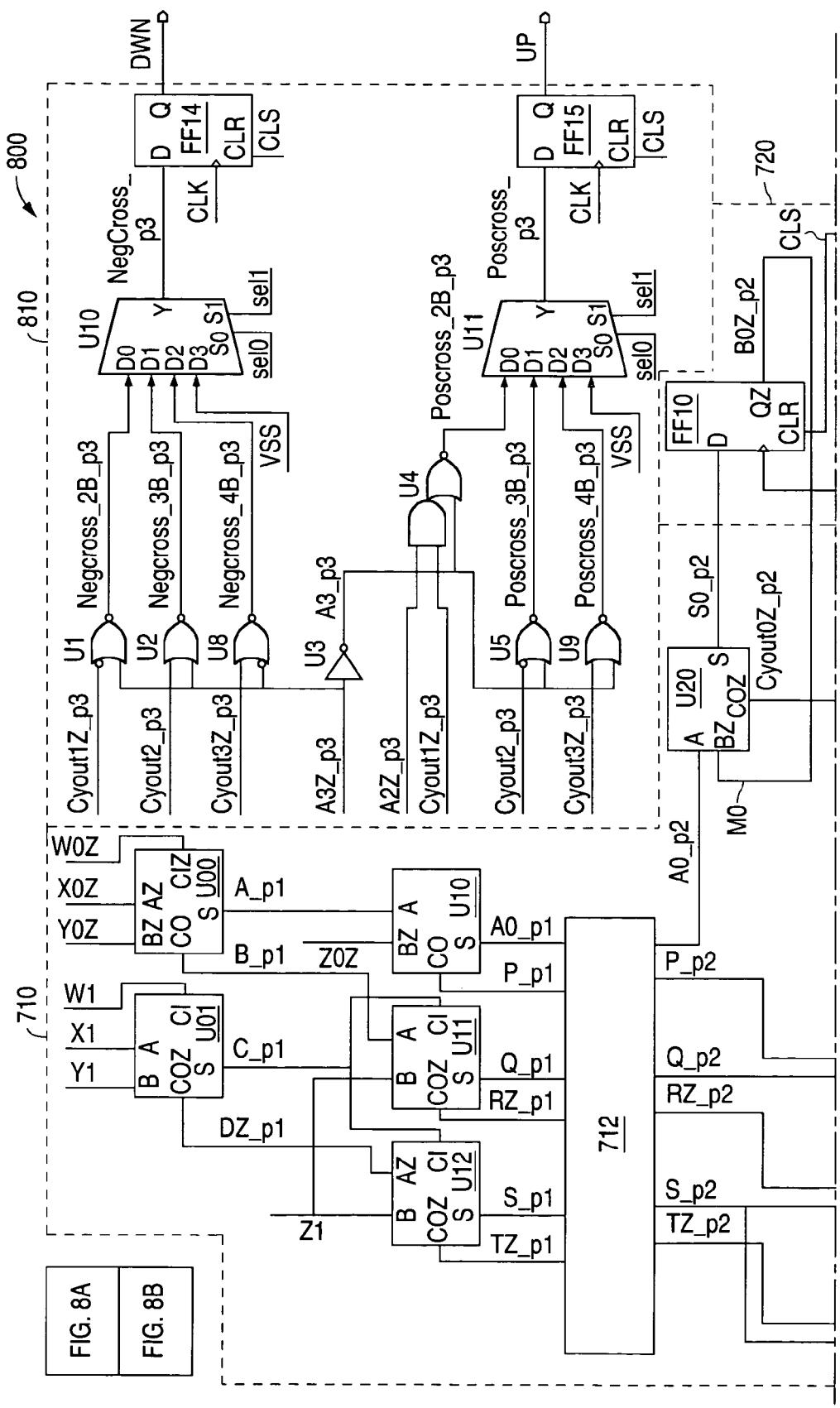
FIGS. 8A-8B are a circuit diagram illustrating an example of a zero crossing detector 800 in accordance with the present invention.
Figure 8B:
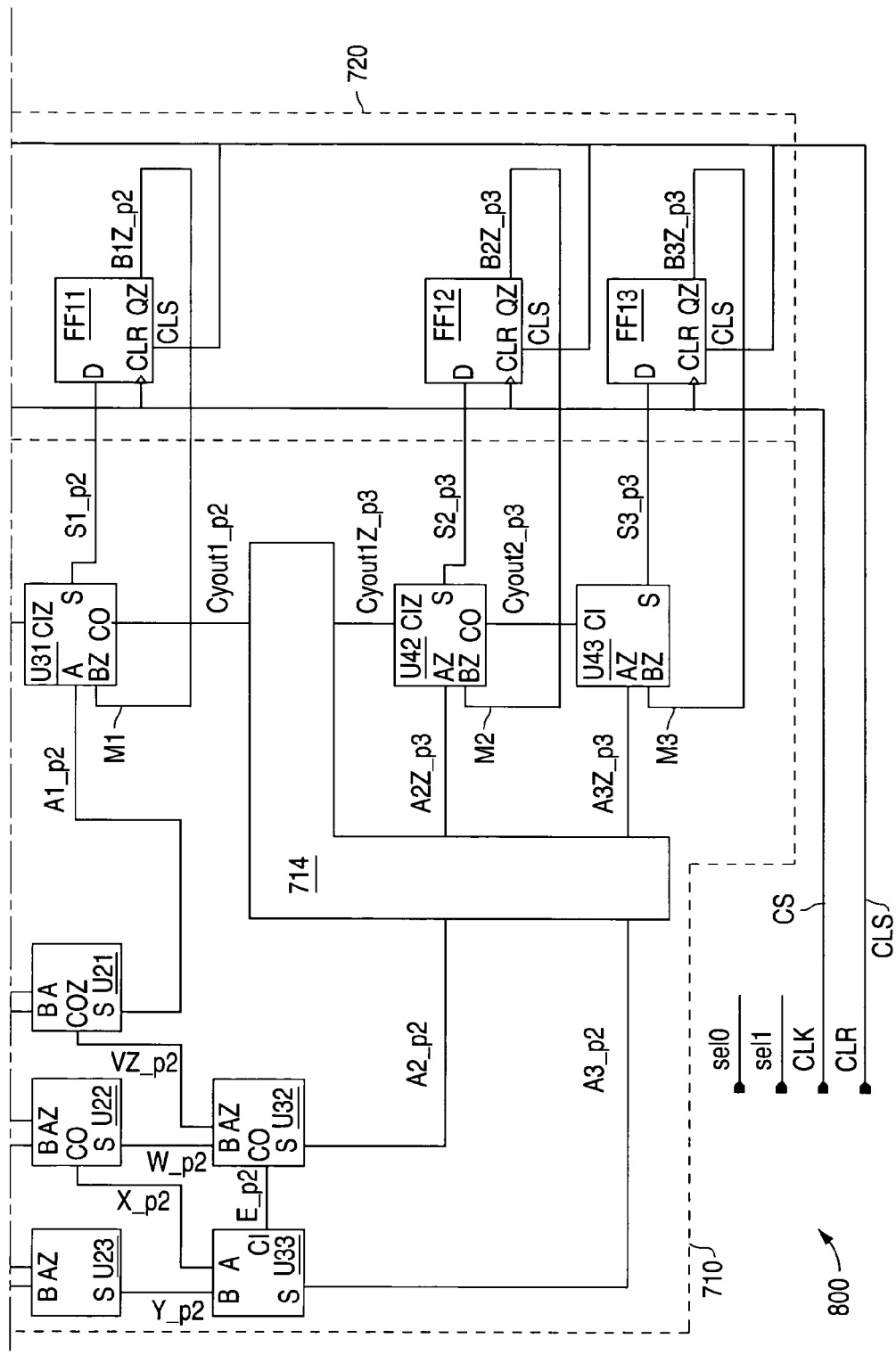

FIGS. 8A-8B show a circuit diagram that illustrates an example of a zero crossing detector 800 in accordance with the present invention. As shown in FIGS. 8A-8B, detector 800 is similar to detector 700 and, as a result, utilizes the same reference numerals to designate the structures that are common to both detectors.

Referring to FIGS. 7A1-7A2 and 8A-8B, it can be seen that detector 800 differs from detector 700 in that detector 800 includes a zero crossing logic block 810 in lieu of zero crossing logic block 722. Logic block 810 is similar to logic block 722, except that logic block 810 contains the additional logic devices U8 and U9. Furthermore, the two-input multiplexers U6 and U7 in logic block 722 have been replaced by the four-input multiplexers U10 and U11 in logic block 810.

As shown in FIGS. 8A-8B, multiplexers U10 and U11, which are controlled by select signals sel0 and sel1, determine whether two-bit zero crossings, three-bit zero crossings or four-bit zero crossings are output from zero crossing logic block 810, e.g., 00=2-bit zero crossings; 01=3-bit zero crossings; 10=4-bit zero crossings; and 11=unused. (For example, multiplexers U10 and U11 pass D0 when sel0 and sel1 both equal zero, D1 when sel0 equals one and sel1 equals zero, D2 when sel0 equals zero and sel1 equals one, and D3 when sel0 and sel1 both equal one.)

Referring to FIGS. 7A1-7A2 and 8A-8B (and ignoring the pipelining subscripts), the logic equations for the zero crossing logic blocks 722 and 810 are as follows:

$$\text{2-bit positive zero crossing} = A3Z*(A2+Cyout1) \quad \text{EQ. 1}$$

$$\text{2-bit negative zero crossing} = A3*Cyout1Z \quad \text{EQ. 2}$$

$$\text{3-bit positive zero crossing} = A3*Cyout2 \quad \text{EQ. 3}$$

$$\text{3-bit negative zero crossing} = A3*Cyout2Z \quad \text{EQ. 4}$$

$$\text{4-bit positive zero crossing} = A3Z*Cyout3 \quad \text{EQ. 5}$$

$$\text{4-bit negative zero crossing} = A3*Cyout3Z \quad \text{EQ. 6}$$

In summary, the zero crossing detectors shown in FIGS. 7A1-7A2 and 8A-8B employ carry save adders combined with fully pipelined logic. As a result of this, these zero crossing detectors provide the following significant advantages: very high operating speed, very low power dissipation, very low adder cell count and minimal chip area.

It should be understood that the above descriptions are examples of the present invention, and that various alternatives of the invention described herein may be employed in practicing the invention. Thus it is intended that the following claims define the scope of the invention, and that structures and methods within the scope of these claims and their equivalents be covered thereby.

What is claimed is:

1. A logic device comprising:
an adder array having a plurality of adder cells, the plurality of adder cells including a half adder cell and a full adder cell, the half adder cell and the full adder cell both having a first data input, a second data input, a sum output, and a carry output, the full adder cell also having a carry input, the adder array further having:
a first row of adder cells having a first adder cell and a second adder cell, the second adder cell in the first row being a full adder, the first adder cell is being a full adder cell; and
a second row of adder cells having a third adder cell, a fourth adder cell, and a fifth adder cell, the third adder cell being a half adder, the fourth adder cell being a full adder, and the fifth adder cell being a full adder, the sum output of the first adder cell being connected to the first input of the third adder cell, and the carry output of the first adder cell being connected to the first input of the fourth adder cell.

2. The logic device of claim 1 wherein the sum output of the second adder cell is connected to the carry input of the fourth and fifth adder cells, and the carry output of the second adder cell is connected to the first input of the fifth adder cell.

3. The logic device of claim 2 wherein the adder array further comprises a pipelined stage connected to the third, fourth, and fifth adder cells that holds and outputs signals generated by the third, fourth, and fifth adder cells in response to a clock signal.

4. The logic device of claim 3 wherein the pipelined stage includes a plurality of flip-flops where each flip-flop is connected to an output from the second row of adder cells.

5. The logic device of claim 3 wherein the adder array further comprises a third row of adder cells having sequentially a sixth adder cell, a seventh adder cell, an eighth adder cell, and a ninth adder cell, the third row of adder cells being connected to the pipelined stage.

6. The logic device of claim 5 wherein the second input of the seventh adder cell receives a signal from the sum output of the fourth adder cell via the pipelined stage, and the first input of the eighth adder cell receives a signal from the carry output of the fourth adder cell via the pipelined stage.

7. The logic device of claim 6 wherein the second input of the eighth adder cell receives a signal from the sum output of the fifth adder cell via the pipelined stage, and the first input of the ninth adder cell receives a signal from the carry output of the fifth adder cell via the pipelined stage.

8. The logic device of claim 7 wherein the adder array further comprises a fourth row of adder cells having sequentially a tenth adder cell, an eleventh adder cell, and a twelfth adder cell.

9. The logic device of claim 8 wherein the second input of the eleventh adder cell receives a signal from the sum output of the eighth adder cell, and the first input of the twelfth adder cell receives a signal from the carry output of the eighth adder cell.

10. The logic device of claim 9 wherein the second input of the twelfth adder cell receives a signal from the sum output of the ninth adder cell.

11. The logic device of claim 9 wherein the adder array further comprises a pipelining stage connected to the eleventh and twelfth adder cells that holds and outputs signals generated by the eleventh and twelfth adder cells in response to a clock signal.

12. The logic device of claim 9 wherein the pipelining stage includes a plurality of flip-flops.

13. The logic device of claim 2 and further comprising a zero crossing logic block connected to the adder array, the zero crossing logic block having a first multiplexer that passes a down signal and a second multiplexer that passes an up signal.

14. The logic device of claim 13 wherein the first and second multiplexers each have a select input and pass one of two signals.

15. The logic device of claim 13 wherein the first and second multiplexers each have a select input and pass one of four signals.

16. An adder comprising:
a plurality of adder cells, the plurality of adder cells including a first adder cell, a second adder cell, a third adder cell, and a fourth adder cell,
the first adder cell having a sum output and a carry output,
the second adder cell having a sum output,
the third adder cell having a first data input connected to the carry output of the first adder cell, a second data input, a carry input connected to the sum output of the second adder cell, and a sum output, and
a fourth adder cell having a data input connected to the second data input of the third adder cell, a carry input connected to the sum output of the second adder cell, and a sum output.

17. The adder of claim 16 wherein:
a first data input of the first adder cell is to receive a first bit of a first multibit word, a second data input of the first adder cell is to receive a first bit of a second multibit word, and a carry input of the first adder cell is to receive a first bit of a third multibit word; and
a first data input of the second adder cell is to receive a second bit of the first multibit word, a second data input of the second adder cell is to receive a second bit of the second multibit word, and a carry input of the second adder cell is to receive a second bit of the third multibit word.

18. The adder of claim 16 wherein the plurality of adder cells includes a fifth adder cell, the fifth adder cell having a first data input connected to a carry output of the third adder cell, a second data input connected to the sum output of the fourth adder cell, a sum output, and a carry output.

19. The adder of claim 16 and further comprising a plurality of flipflops, the plurality of flipflops including a first flipflop, a second flipflop, and a third flipflop, the first flipflop having a data input connected to the sum output of the third adder cell, the second flipflop having a data input connected to an inverted carry output of the third adder cell, and the third flipflop having a data input connected to the sum output of the fourth adder cell.

20. The adder of claim 19 wherein the plurality of adder cells includes a fifth adder cell, the fifth adder cell having an inverted data input connected to an inverted data output of the second flipflop, a non-inverted data input connected to a data output of the third flipflop, a sum output, and a carry output.

21. The adder of claim 20 wherein the plurality of adder cells includes a sixth adder cell, the sixth adder cell having a data input to the sum output of the fifth adder cell, a sum output, and a carry output.

22. The adder of claim 21 wherein the plurality of flipflops includes a fourth flipflop, the fourth flipflop having a data input connected to the sum output of the sixth adder cell, and an inverted data output.

* * * * *

UNITED STATES PATENT AND TRADEMARK OFFICE
CERTIFICATE OF CORRECTION

PATENT NO. : 7,424,507 B1  
APPLICATION NO. : 10/955697  
DATED : September 9, 2008  
INVENTOR(S) : Pasqualini Page 1 of 1

It is certified that error appears in the above-identified patent and that said Letters Patent is hereby corrected as shown below:

Column 5,
Line 22, delete "VT1" and replace with --WT1--.

Column 9,
Lines 44, 49, 50, 51, 52, delete "sell" and replace with --sel1--.

Column 10,
Line 24 claim 1, delete "is".

Signed and Sealed this

Fourth Day of November, 2008

JON W. DUDAS  
*Director of the United States Patent and Trademark Office*